Figure 1:
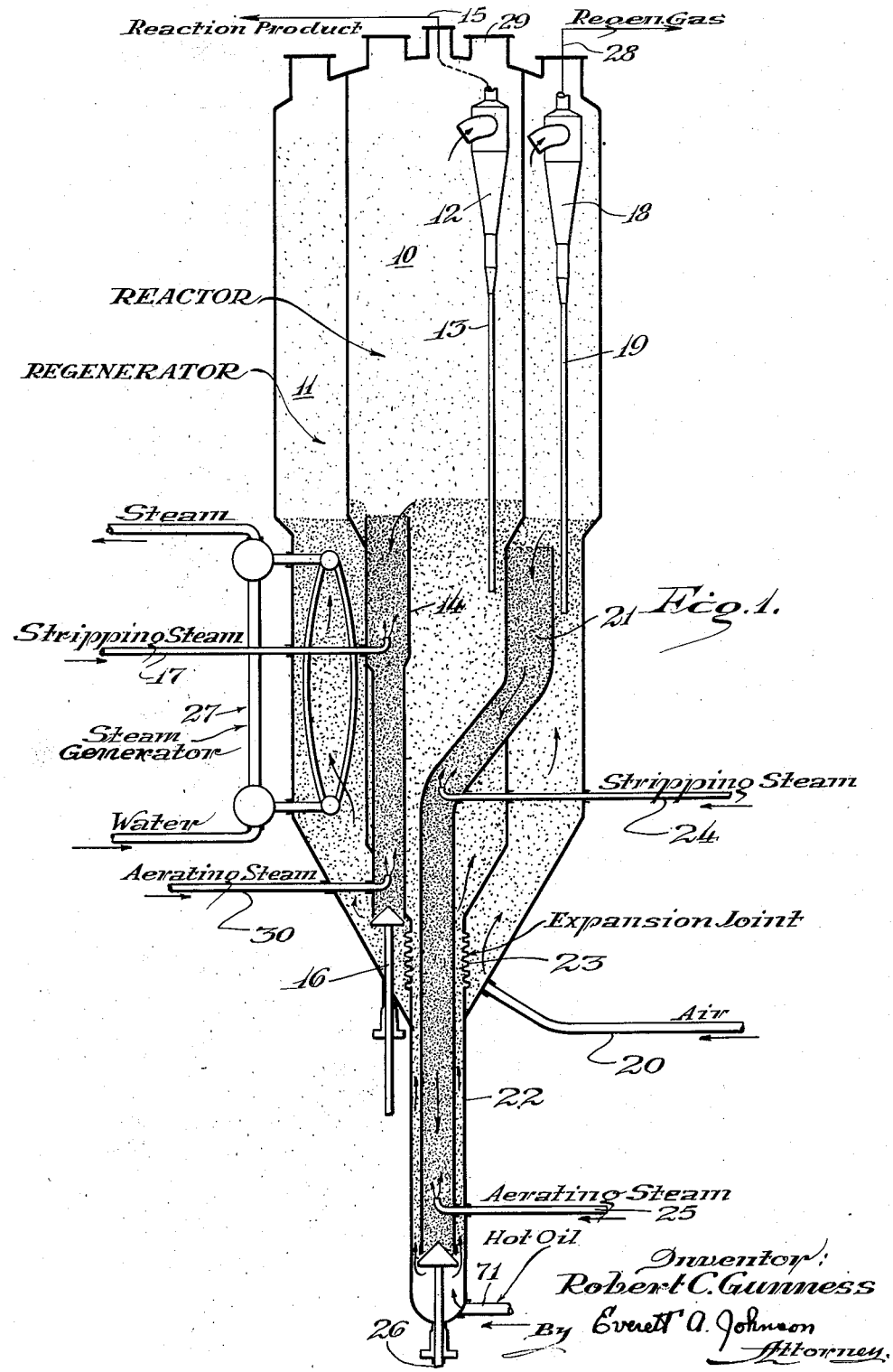

Patented Oct. 14, 1947

2,428,872

UNITED STATES PATENT OFFICE 2,428,872

PROCESS AND APPARATUS FOR CONTACTING SOLIDS AND GASES

Robert C. Gunness, Chicago, Ill., assignor to Standard Oil Company, Chicago, Ill., a corporation of Indiana Application September 30, 1941, Serial No. 412,989

15 Claims. (Cl. 196—52)

My invention pertains to a catalytic hydrocarbon conversion system and it relates more particularly to improvements in process and unitary apparatus for handling fluid catalyst in a so-called fluid-type hydrocarbon catalytic conversion system.

In the fluid-type catalytic hydrocarbon conversion system a powdered or granular catalytic material effects conversion while the catalyst is suspended in the gases or vapors undergoing reaction within a hindered settling zone. The catalyst and reaction products are separated and the catalyst recycled to a reaction zone or passed to a regenerator. The spent catalyst can be regenerated by suspending it in a gas mixture in which case a regenerated catalyst and regeneration gases must be separated before the catalyst is returned to the reaction zone.

The powdered or fluid-type catalytic hydrocarbon conversion system can employ a wide variety of catalysts, charging stocks, operating conditions, etc. for effecting alkylation, aromatization, dehydrogenation, desulfurization, gas reversion, hydrocarbon synthesis, hydrogenation, isoforming, isomerization, polymerization, reforming, etc., but it is particularly applicable to the catalytic cracking of reduced crude and gas oil for the production of high antiknock motor fuels and aviation gasolines.

An object of my invention is to provide improved methods and means for removing catalyst from a reactor or regenerator. A further object is to minimize expansion difficulties, particularly in connection with standpipes which are employed for obtaining the necessary pressure differentials for transferring catalyst from one zone to another. Another object is to provide a unitary conversion-regeneration apparatus which will be less expensive to fabricate and more efficient to operate than any prior system of this type.

A further object of my invention is to provide a more simple and efficient method and means for separating catalyst from gases or vapors in a regenerator or reactor and for minimizing the energy required to transfer catalyst from one zone to another. Other objects of the invention will be apparent as the detailed description proceeds.

In practicing my invention I provide a combination reactor and catalyst regenerator for use in hindered-flow powder-type catalytic cracking wherein the catalyst regenerator is concentric with the reactor. A feature of the invention is the reduction in the overall height of a combination reactor and regeneration unit. Another important feature is the use of internal standpipes whereby the number of large, costly expansion joints is reduced. The internal standpipes are not subject to stresses or strains occasioned by the temperature changes. Furthermore, the internal standpipes minimize heat losses and since for at least a part of their length they are in heat exchange relationship with or partially surrounded by the cracking and regeneration zones, heat radiated from high temperature portions of the system may be absorbed by lower temperature solids in an adjacent or contiguous portion of the system.

A feature of my invention is the withdrawal of catalyst from the upper part of a reactor directly from a dense turbulent suspended catalyst phase and the introduction of said catalyst into the dense suspended phase of the regenerator. Likewise the regenerated catalyst can be withdrawn from the upper part of the dense turbulent suspended catalyst phase within the regenerator and introduced into the dense phase of the reactor.

In one embodiment spent catalyst from the dense phase of the reaction zone overflows into a standpipe or standpipes which lead to the lower part of the dense phase of the regeneration zone. Likewise, the regenerated catalyst from the dense phase of the regeneration zone overflows into a standpipe which leads to a point substantially below the base of the regenerator but within an extension of the reactor. The effective level of the dense phase of the catalyst in the reactor is maintained at a sufficient height to produce flow into the regenerator. Stripping is accomplished in the upper sections of the reactor standpipe and the regenerator standpipe.

Catalysts adapted to my process are, for example, of the silica-alumina or silica-magnesia type. The catalyst can be prepared by the acid treating of natural clays such as a bentonite or by synthetically preparing a powdered silica-alumina or silica-magnesia mixture. Such a mixture can be prepared by ball-milling silica hydrogel with alumina or magnesia, drying the resulting dough at a temperature of about 240° F. and then activating by heating to a temperature of between about 900° F. and about 1000° F.

The catalyst per se forms no part of the present invention and it is therefore unnecessary to describe it in further detail.

When using powdered catalyst having a particle size of between about 1 and about 135 microns, I prefer to employ vapor velocities in the reactor of between about 0.4 and about 4.0 feet per second, for example about 1.5 to 2 feet per second. The catalyst-to-oil weight ratio can be between about 0.5:1 and about 20:1 and is preferably about 8 or 10 to 1 when cracking reduced crude. The catalyst residence time may range from a few seconds to an hour or more, for example, it may be about 4 to 10 minutes. The vapor residence time is usually about 10 to 30 seconds. The temperature prevailing throughout the reactor may be maintained at between about 850° F. and about 1050° F., for example 900° F. for motor gasoline. Lower temperatures, for example about 750° F. are satisfactory for aviation fuels.

The catalyst in this specific example is in powder form with a particle size of between about 1 and about 135 microns, i. e., with about 50% of the catalyst passing a 400-mesh screen. The invention is applicable, however, to other catalyst sizes provided only that the catalyst is such size and density that it can be aerated and handled as a fluid in the manner herein described. Higher gas or vapor velocities may be required for coarser catalyst particles but these particles can be of such size as to be retained on a 400, 300, 200, 100, or even 50-mesh screen.

The density of the catalyst particles per se may be as high as 160 pounds per cubic foot, but the bulk density of the catalyst which has settled for five or ten minutes will usually be from about 35 to about 60 pounds per cubic foot. With slight aeration, i. e., with vapor velocities of between about 0.05 and about 0.5 feet per second, the bulk density of 1 to 135 micron catalyst will be between about 20 and about 30 pounds per cubic foot. With vapor velocities of between about 1 and about 3 feet per second, the catalyst is in the dense turbulent suspended catalyst phase and the bulk density of such catalyst may be between about 10 and about 20 pounds, for example about 15 to 18 pounds per cubic foot. With higher vapor velocities, i. e., the vapor velocities existing in transfer lines, the catalyst is in a dilute dispersed phase, the density of which may be only about 1 or 2 pounds per cubic foot, or even less. Similarly, the light dispersed catalyst phase in the top of the reactors or regenerators can have a density of between about 50 or 100 grains and about 3 pounds per cubic foot. The light dispersed catalyst phase is at least 5, and preferably is at least 12 pounds per cubic foot lighter than the dense turbulent suspended catalyst phase. This latter phase is at least 1, preferably at least 5, pounds per cubic foot lighter than the aerated catalyst being transferred to the dense phase.

The bulk density of the aerated catalyst phase or the dense turbulent suspended catalyst phase is greater in the absence of appreciable catalyst fines than in the presence of substantial amounts of such fines. When the recovered catalyst consists almost entirely of fines, as exemplified by catalyst particles separated from the dilute phase by cyclones, the bulk density of settled or lightly aerated catalyst may be only 10 or 15 pounds per cubic foot.

In practicing my invention I withdraw catalyst directly from the upper part of the dense turbulent suspended catalyst phase through one or more overflow pipes or standpipes which are of the suspended or internal type standpipe herein described. The catalyst in the standpipes is in the dense aerated phase and is therefore of greater bulk density than the catalyst in the dense turbulent suspended catalyst phase. I utilize the difference in resultant static pressure to provide the catalyst head in the standpipes required for transferring catalyst from the reactor to the regenerator, or from regenerator to reactor, and for preventing the flow of gases from one zone to another. Catalyst fines are centrifugally separated from gases or vapors leaving either the reactor or regenerator and are introduced into the main body of catalyst in the respective reactor or regenerator. Other features of the invention will be apparent from the following detailed description.

Figure 2:
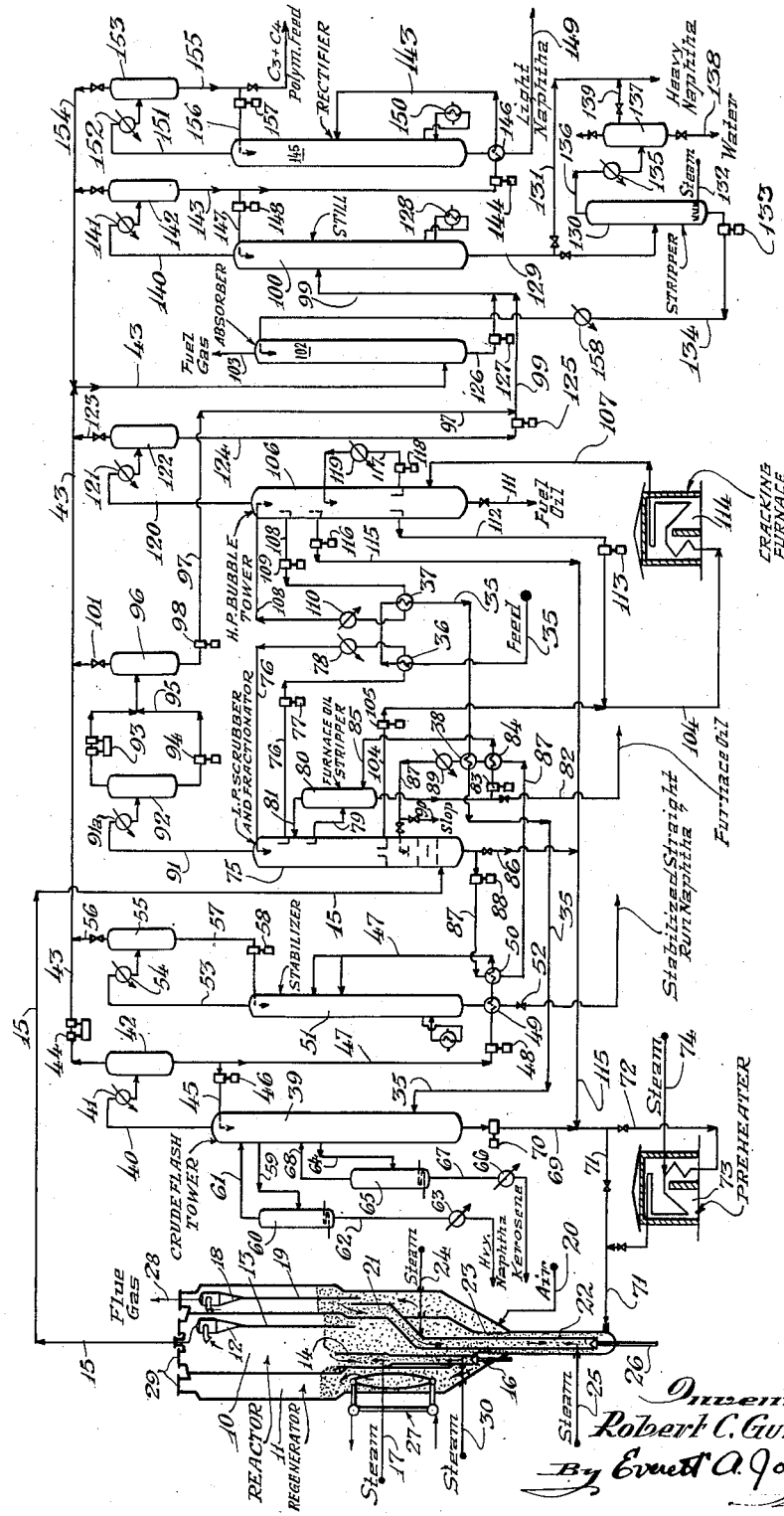

In the accompanying drawing which constitutes a part of this disclosure and in which similar elements are designated by corresponding reference characters:

Figure 1 is a schematic diagram of a unitary catalytic unit of the concentric reactor-regenerator type; and Figure 2 is a schematic flow diagram of a catalytic cracking system adapted for processing reduced crude.

To illustrate my invention I will describe the system for the catalytic cracking of reduced crude by means of a silica-alumina catalyst as hereinabove described, i. e., a catalyst having a particle size of about 10 to 135 microns.

Figure 1 illustrates diagrammatically in more or less detail a unitary reactor 10 within regenerator 11. Hereinafter this arrangement is referred to as being concentric. Reactor 10 should be designed to provide a vertical vapor velocity therein of between about 1 and about 3 feet per second at a temperature within the range of between about 800 and 1050° F., preferably between about 900° F. and about 1000° F., and at a pressure of between about atmospheric and about 50 pounds per square inch, for example about 13 pounds per square inch at its base. The charging stock may be heated in a pipe still to this reaction temperature or it may be simply preheated and only partially vaporized in the pipe still, at least a substantial part of the heat of cracking and, if desired, the heat required for vaporization being supplied by the sensible heat contained in the hot regenerated catalyst introduced into the reactor 10.

The ratio of introduced catalyst to introduced oil in reactor 10 may range from about 0.5:1 to about 20:1 depending upon the activity of the catalyst, the amount of heat which is to be supplied to the reactor, and the desired catalyst residence time within the reactor. Where reduced crude is employed as a charging stock the catalyst-to-oil ratio may be about 8:1 or 10:1, or higher, in order to supply at least a considerable part of the heat of vaporization as well as the heat of cracking by the sensible heat contained in the added catalyst.

As stated above, the upflowing vapors in the reactor 10 are of such velocity as to maintain a dense turbulent suspended catalyst phase throughout the conversion zone. The reactor 10 may be about 70 or 80 feet high and it is provided with an enlarged upper section to facilitate the settling of catalyst out of the dilute phase into the dense turbulent suspended catalyst zone. Catalyst fines are knocked out of the cracked vapors in cyclone separators 12 and returned through dip legs or standpipes 13 to the dense turbulent phase or directly to the standpipe 14. Ordinarily the cyclone separators 12 will be employed in groups of several sets, each set comprising three stages. However, when desired one or more stages may be operated in parallel. The vapors from line 15 pass to the recovery apparatus described below.

The reactor 10 comprises the inner of two concentric shells and extends substantially below the base of the outer shell. The regeneration zone 11 is in heat exchange with reaction zone 10. A standpipe 14 extends upwardly into reactor 10 for a distance of about 20 or 40 feet and downwardly within the regenerator 11 to a point near its base. Spent catalyst from the dense turbulent suspended catalyst phase overflows the upper end of this standpipe 14 and is stripped with steam therein introduced by line 17 before being withdrawn via valve 16 into regenerator 11. Aerating steam diagrammatically illustrated as being introduced near the lower end of standpipe through line 30 ordinarily will be distributed over the length of standpipe through several introduction ports (not shown).

The regenerator 11 is of larger diameter than the reactor 10 and both may be provided with an enlarged top section to facilitate the settling of catalyst particles out of the upper dilute catalyst phase. Cyclone separators 18 knock back the catalyst fines removed from the regeneration gas and pass by dip legs or standpipes 19 into the dense phase. Air or other oxygen-containing regeneration gases may be admitted to the regenerator 11 by means of conduit 20 near the base thereof. The regenerated catalyst flows from a point near the top of the dense turbulent suspended catalyst zone into standpipe 21 extending downwardly within the regenerator 11 and reactor 10. The lower portion of the standpipe 21 is concentric with or merely within vertical conduit 22 extending downwardly from the base of reactor 10. Expansion joint 23 is provided between conduit 22 and the base of reactor 10. Stripping and aerating steam lines 24 and 25 are provided to permit the stripping of oxygen-containing gas out of the rgenerated catalyst before the catalyst is carried upwardly through vertical transfer line 22 to the reactor 11. The regenerated catalyst and charging stock flow upwardly through vertical transfer line 22 and discharge into the dense turbulent phase of reactor 10 at the base thereof. The regenerator 11 may be operated at a slightly lower pressure than the conversion zone or it may be operated at substantially the same pressure since the bulk density of aerated catalyst in standpipe 21 is greater than the bulk density of the dense turbulent suspended catalyst phase through which this standpipe extends thereby resulting in a difference in static pressure. Thus the pressure at the base of standpipe 21 may be from 1 to 5 pounds per square inch greater than the pressure in the vertical extension of the reactor 10 at this point. Valve 26 is designed to automatically close and seal the lower end of the standpipe if this pressure differential becomes less than about 1 pound per square inch because it is extremely important that the vapors or gases from one zone should be prevented from reaching the other.

If more heat is liberated in the regenerator than safely can be stored in the catalyst without exceeding the upper desired temperature limits of between about 1000° F. and 1050° F. (sometimes higher, e. g., 1300° F. with certain catalysts) it is necessary to provide means for removing heat from the regenerator. Such heat may be removed by the provision of heat exchange tubes in the regenerator, such tubes preferably being mounted around the periphery thereof so that they will not interfere with the dense turbulent suspended catalyst phase phenomenon. Boiler 27 represents one such unit.

An alternative method of temperature control is to recycle the catalyst through a cooler and return the cooled catalyst to the regenerator. Thus catalyst may be removed from the upper part of the dense turbulent suspended catalyst phase in the regenerator, passed through a cooler (not shown), and returned to the regenerator at a point near its base. Additional temperature control may be effected by the amount and temperature of the regeneration gases introduced by line 20. In any event the amount of air or oxygen-containing gas introduced through line 20 must be sufficient to effect the desired regeneration and to provide for a vertical gas velocity in the regenerator of between about one and three feet per second in order that the desired dense turbulent suspended catalyst phase may be maintained in the regenerator up to at least the top level of standpipe 21. The flue gas from line 28 may be passed through suitable heat exchangers or turbines for recovering heat or energy therefrom and catalyst dust may be separated by means of an electrostatic precipitator and reintroduced into the system by any desired means.

Provision for the withdrawal of cyclones from the top of the reactor or regenerator is made by placing manholes 29 of sufficient size on the shoulder of the regenerator and on the top of the reactor to permit the withdrawal of said cyclones.

Referring to Figure 2, crude is charged to the system by line 35. It picks up heat in exchangers 36, 37 and 38, and then is subjected to a flashing operation in crude flash tower 39, entering the tower 39 at a temperature within the range of between about 500° F. and about 700° F. The gas and light naphtha from this crude flashing operation are withdrawn overhead by line 40, passed through cooler 41 and thence to separator 42. The separated gas is sent to the absorption step by line 43 and compressor 44. A portion of the light naphtha may be returned to the crude flash tower 39 by line 45 and pump 46 as reflux. However, the greater portion of the light naphtha is sent via line 47, pump 48, bottoms heat exchangers 49 and 50 to high pressure stabilizer 51. A stabilized straight run naphtha is recovered by valved line 52. The overhead from stabilizer 51 is sent by line 53 and cooler 54 to high pressure separator 55, the gas fraction being cycled to the gas absorption step by lines 56 and 43. The reflux condensate is recycled by line 57 and pump 58 to the stabilizer 51.

Reverting to the crude flash tower 39, heavy naphtha and kerosene can be withdrawn as side streams. Thus a heavy virgin naphtha is withdrawn by line 59 to stripper 60. Vapors from the stripper 59 are returned to crude flash tower 39 by line 61. The heavy naphtha is withdrawn from the stripper 60 via line 62 and cooler 63. Similarly the kerosene cut is obtained by line 64, stripper 65, cooler 66 and line 67. Lighter products are returned to the flash tower 39 by line 68.

The reduced crude is withdrawn as bottoms from flash tower 39 by line 69 and charged via pump 70 and valved line 71 to reactor 10. If desired, substantially all the heat necessary for cracking can be supplied by the regenerated catalyst. Alternatively the feed can be diverted by means of valved line 72 through furnace 73, being preheated therein to a temperature of between about 900° F. and 1100° F. Between about 2% and about 20% steam can be added to the charge via line 74.

The products from the catalytic cracking are removed from reactor 10 via line 15 and passed to low pressure scrubber and fractionator 75. The scrubber and fractionator 75 may be operated at about 5 p. s. i. with a temperature of between about 200° F. and 250° F. near its top and a bottoms temperature between about 500° F. and about 600° F. If desired, conventional means can be used to supply heat to the fractionator 75. The gases and light naphtha are taken overhead by line 91 to an absorption step for recovery of condensibles as described below.

A reflux side stream is withdrawn by line 76 and pump 77, passed through heat exchanger 36, cooler 78, and returned to fractionator 75. A furnace oil cut is taken off by line 79 to furnace oil stripper 80, the overhead from stripper 80 being returned to a higher point in the fractionator 75 via line 81. A stabilized furnace oil may be taken off by valved line 82. The bottoms from 80 may leave at a temperature of between about 400° F. and about 500° F. and reenter tower 75 at between about 325° F. and 425° F. A portion of the furnace oil can be heated for operation of 80 by passing in heat exchange with bottoms from fractionator 75. This can be done by means of line 85, pump 83 and heat exchanger 84.

A portion of the heavy bottoms can be diverted from line 86 via line 87 and pump 88 through heat exchangers 50, 84, and 38 and returned to fractionator 75 via line 87. Cooler 89 in line 87 removes residual heat and furnishes the scrubbing liquid for removing catalyst fines from the vapors. The catalyst slurry can be recycled to catalytic cracking by lines 86 and 115. A valved line 90 is provided to permit the withdrawal of the heavy fractionator bottoms from the system if desired.

The overhead from low-pressure scrubber and fractionator 75 is removed via line 91 and the temperature of this stream may be between about 200° F. and 250° F. These gaseous products are passed through cooler 91a and thence into separator 92. The overhead gases from low-pressure separator 92 are compressed by compressors 93 and the liquid bottoms are pumped by pump 94 and line 95 into high-pressure separator 96. The liquid bottoms from high-pressure separator 96 is pumped via line 97 and pump 98 to line 99 leading to still 100. The gases pass via lines 101 and 43 to absorber 102. The unabsorbed gases from absorber 102 are removed as fuel gas via line 103.

A light gas oil ordinarily is withdrawn from fractionator 75 by line 104 and pump 105 and charged to the thermal cracking furnace 114. The thermal cracking is conducted at a temperature of between about 700° F. and about 1100° F. and under a pressure of between about 600 and 1000 pounds per square inch.

The cracked product enters high-pressure bubble tower 106 via transfer line 107. Reflux for the tower 106 is provided by taking off a side stream by line 108 and pump 109, passing the stream through heat exchanger 37 and cooler 110 and returning the cold stream to the top of the high-pressure bubble tower 106. A heavy fuel oil is withdrawn by valved line 111 as bottoms from high-pressure bubble tower 106. A recycle gas oil is withdrawn via line 112 and pump 113 and recycled to the thermal cracking furnace 114 via line 104. An intermediate gas oil is withdrawn via line 115 and pump 116 for catalytic cracking. This side stream is blended with the reduced crude and enters reactor 10 by lines 69 and 71 or via preheater furnace 73 and lines 72 and 71. A portion of the intermediate gas oil cut may be removed via line 117, pump 118 and cooler 119 and returned to the high-pressure bubble tower 106 to control the temperature thereof.

The gases and vapors from high-pressure bubble tower 106 are removed overhead via line 120, are passed through cooler 121 and introduced to high pressure separator 122. The gases from separator 122 are passed via line 123 to line 43 and thence to absorber 102 with the gaseous vapors recovered in the initial high-pressure separating zone and those resulting from the crude flashing. The liquid product recovered in high-pressure separator 122 is withdrawn as bottoms via line 124 and introduced by pump 125 and line 99 with the rich absorber oil from abosrber 102 and naphtha from line 97 into still 100. Rich absorber oil is withdrawn by line 126 and passed by pump 127 into line 99.

Still 100 is provided with trapout and reboiler 128. The bottoms from still 100 comprising lean absorber oil is withdrawn by valved line 129 to stripper 130, or can be diverted via valved line 131 and recovered as heavy naphtha. The absorber oil or heavy naphtha from still 100 is subjected to stripping in stripper 130 by means of steam introduced through valved line 132 and then recycled via pump 133, line 134 and cooler 158 to the absorber 102. The overhead from stripper 130 is passed through cooler 135 on line 136 and introduced into separator 137. Water is withdrawn as bottoms by valved line 138 and the separated naphtha is recovered by valved line 139.

The catalytically and thermally cracked gasoline removed overhead from still 100 by line 140 passes through cooler 141 and into separator 142. The light naphtha is withdrawn as bottoms from separator 142 by valved line 143 and pump 144 and passed in heat exchange with the bottoms from rectifier 145 before entering the rectifier. Heat exchanger 146 is provided for this purpose. If desired, a portion of the light naphtha may be diverted from valved line 143 to still 100 by valved line 147 and pump 148 provided for that purpose.

The light cracked naphtha is withdrawn as bottoms from the rectifier 145 by means of valved line 149. Reboiler 150 is provided to supply additional heat necessary in the rectification step. The normally gaseous hydrocarbons withdrawn as the overhead from rectifier 145 by valved line 151 pass into cooler 152 and thence to separator 153 wherein the gases are removed under high-pressure and sent to absorber 102 by lines 154 and 43 with other gases recovered from the system. The liquid product removed by line 155 may be recovered as a polymerization feed and a portion of it may be returned to rectifier 145 by valved line 156 and pump 157 as reflux.

In one embodiment of my invention, crude oil is charged to the system, heated by heat exchange up to about 450° F., and subjected to a flashing operation. The liquid reduced crude then can be preheated up to about 1100° F. and charged to the reactor 11 via upflow conduit 22 as described above. If desired, process steam may be injected via line 74 in proportions of between about 2 and 20% of the charge. The temperature within the reactor can be between about 850° F. and about 1050° F., for example about 950° F., and can be under a pressure of between about 5 and about 25 pounds per square inch, for example about 13 pounds per square inch in the dense turbulent phase and about 10 pounds per square inch in the dilute phase. The spent catalyst is introduced to the regenerator 11 by standpipe 14. A temperature of between about 900° F. and 1050° F., for example 1000° F., is maintained with pressures of between about 8 and 20 pounds per square inch, for example 12 pounds per square inch within the dense turbulent phase. In the base of downflow conduit a pressure of about 17 pounds per square inch is maintained, thus assuring flow of the catalyst from the regenerator zone into the reactor zone. Likewise, the pressure at the base of upflow conduit 22 is about 14 pounds per square inch, which gives a differential of approximately 3 pounds per square inch.

The pressure in low-pressure scrubber and fractionator 75 is maintained at about 5 pounds per square inch, the inlet temperature is about 750° F., the liquid outlet temperature is between 500 and 600° F., and the light naphtha and gases leave the fractionator 75 at a temperature of between about 200° F. and about 250° F.

From the above description it will be seen that the applicant has provided a unique process combining catalytic cracking of liquid feed in a fluid catalyst system and thermal cracking of a recycle stock. Crude oil is heated and subjected to a flashing operation. The gas and light naphtha from this crude flashing operation are separated and the gas is sent to an absorption step for recovery of condensables. A straight-run stabilized naphtha is recovered. Heavy virgin naphtha and kerosene are withdrawn as side streams from the crude flashing operation. Reduced crude is sent as a liquid and/or vapor to the fluid catalyst cracking process, and in the embodiment illustrated a combination reactor-regenerator is used wherein the reactor and regenerator are concentric. However, the process which we have described is not limited to the use of this type of apparatus.

The product from the catalytic cracking step is fractionated and the gas is passed to an absorption step for recovery of the condensables. The naphtha cut from the catalytic cracking step is also sent to the absorption system along with the gases. The gas oil from the fractionation of the product from the catalytic cracking of the reduced crude is thermally cracked. This thermally cracked product is fractionated, the light product being sent to the absorption system, a light gas oil is sent to the catalytic cracking step, a heavy gas oil is recycled to the thermal cracking step, and a high-boiling fraction is eliminated as fuel oil. The light naphtha, a heavy naphtha and a polymerization feed are separated and recovered in the absorption system.

While I have described my process and apparatus in terms of particular embodiments thereof, it should be understood that I do not desire to be limited except as by the following claims.

I claim:

1. A catalytic contacting system which comprises an upflow reactor concentric within a regenerator, a reactor standpipe extending from within said reactor to a point near the base of said regenerator, means for introducing hydrocarbon into the lower part of the reactor, means for introducing regenerated catalyst into the reactor whereby said introduced catalyst may be suspended in the hydrocarbons for effecting conversion, said means comprising a conduit extending from within said regenerator to within an upflow conduit communicating with the base of the reactor, means for separating catalyst from reaction vapors leaving the top of said reactor and for returning said separated catalyst to the lower part of the reactor, means for introducing catalyst from the reactor standpipe into the lower part of the regenerator, means for introducing air in the lower part of the regenerator so as to disperse catalyst from the reactor standpipe as a turbulent suspended dense catalyst phase in the regenerator, and means for separating catalyst from regeneration gases and for returning said separated catalyst to the lower part of the regenerator.

2. In an apparatus for converting hydrocarbon oils by the aid of suspended solid catalyst including a reaction zone and a regeneration zone, a vertically disposed elongated seal extending from an intermediate point within said reaction zone to a point within the said regeneration zone, means for maintaining a column of catalyst within said seal, means for discharging catalyst from said seal into said regeneration zone, means for introducing oxygen-containing gases into said regeneration zone, means for introducing regenerated catalyst and hydrocarbon feed into said reaction zone, and means for discharging reaction products from said reaction zone, the improvement comprising a vertically disposed elongated catalyst draw-off extending from within said regeneration zone and communicating at its base with a vertically disposed upflow conduit surrounding the lower end of said draw-off and extending from the base of said reaction zone for conveying catalyst from said regeneration zone to said reaction zone, means for discharging catalyst from said catalyst-draw-off into said upflow conduit, and means for introducing hydrocarbons into said upflow conduit.

3. An apparatus for contacting gases or vapors with suspended solid particles which comprises a first vertically elongated contacting chamber and a second contacting chamber, a common wall between said first and second contacting chambers means for separating solid particles within said chambers, a first substantially vertically disposed elongated conduit extending between said first and second contacting chambers, a second substantially vertically disposed elongated conduit extending between said second and first contacting chambers, each of said conduits being adapted continuously to transfer separated solid particles downwardly from the respective contacting chambers, separate means for introducing contacting gases or vapors into the said contacting chambers, means for maintaining a column of fluent solid particles within each of said conduits to seal the vapors or gases between said contacting chambers, and separate means for discharging gases or vapors from each of said chambers.

4. An apparatus for catalytic contacting by the aid of fluent solid catalysts which comprises a reaction chamber and a concentric regeneration chamber, means for effecting the catalytic contacting while maintaining the fluent solid catalysts in each of said chambers in a dense turbulent suspended phase, internal conduit means extending downwardly from an intermediate point in each of said chambers for transferring the catalyst from each of said chambers in a dense aerated phase and means for controlling the flow of catalyst from the base of said conduits.

5. An apparatus for converting hydrocarbon oils by the aid of suspended solid catalysts which comprises a reaction chamber and a regeneration chamber, separate means for maintaining a dense turbulent dispersed catalyst phase in each of said chambers, means in each of said chambers for knocking back catalyst to a low point therein, a substantially vertically disposed elongated conduit extending from an intermediate point within said reaction chamber to a low point in said regeneration chamber, means for flowing downwardly a column of dense aerated catalyst through said conduit, means for discharging catalyst from said conduit into said regeneration chamber, means for introducing oxygen-containing gases into said regeneration chamber, an elongated conduit extending downwardly from an intermediate point within said regeneration chamber to a low point communicating with the reaction chamber, and means for introducing hydrocarbons into said reaction chamber.

6. The process of converting hydrocarbons by contacting with suspended solid catalyst comprising effecting the desired contact between catalyst and hydrocarbons at conversion temperatures in a reaction zone, maintaining a dense turbulent suspended catalyst phase within the reaction zone, maintaining within said reaction zone a relatively dilute catalyst phase above said dense catalyst phase continuously separating catalyst within the said reaction zone from the products of the reaction, maintaining the separated catalyst at the reaction temperature of the reaction zone, separately withdrawing from said reaction zone the products of reaction, conducting said separated catalyst downwardly from said reaction zone in a dense aerated phase and discharging directly into a regeneration zone maintained in heat exchange with said reaction zone, dispersing said catalyst in a dense turbulent suspended phase in contact with oxygen-containing regeneration gas within said regeneration zone whereby carbonaceous matter accumulated on said catalyst is removed by combustion, continuously separating catalyst from regeneration gases within said regeneration zone, discharging the regeneration gases from the regeneration zone and accumulating directly the regenerated catalyst in a relatively dense phase within said regeneration zone, separately withdrawing regenerated catalyst downwardly in said dense phase, stripping residual regeneration gases from said dense phase catalyst and commingling the stripped regenerated catalyst with the hydrocarbons to be converted.

7. A method of converting hydrocarbons in the presence of powdered catalyst which comprises mixing powdered cracking catalyst with relatively heavy hydrocarbons and maintaining the mixture as a dense fluidized mass in a reaction zone for a sufficient time for the desired cracking, withdrawing vaporous reaction products and spent catalyst from said reaction zone, introducing the spent catalyst into a stripping zone, stripping the spent catalyst, passing the stripped spent catalyst to a regeneration zone surrounding at least a portion of said stripping zone and said reaction zone, introducing a regenerating gas into said regeneration zone, withdrawing regenerated catalyst from said regeneration zone, and returning said regenerated catalyst to the reaction zone.

8. The method of contacting solids of small particle size with at least two separate gaseous streams which method comprises suspending such solids in a first gaseous stream and passing said stream upwardly in an inner contacting zone at a velocity for maintaining a dense turbulent suspended solids phase therein superimposed by a light phase of low solids content, passing dense phase solids downwardly directly from said dense phase as an aerated solids column in a restricted zone which is at least partially surrounded by said inner contacting zone and which communicates at its upper end with said inner contacting zone, discharging aerated solids from the base of said column into an outer contacting zone which at least partially surrounds said inner contacting zone and is in heat exchange relationship thereto, suspending solids thus discharged from said column in a second gaseous stream and passing said gaseous stream upwardly in said outer contacting zone at a velocity for maintaining a dense turbulent suspended solids phase therein superimposed by a light phase of low solids content, withdrawing dense phase solids directly from said last-named dense phase as a second downwardly moving aerated solids column from said outer contacting zone for resuspension in said first gaseous stream, withdrawing said first gaseous stream from the light phase above the dense phase in said inner contacting zone, withdrawing said second gaseous stream from the light phase above the dense phase in the outer contacting zone, and maintaining the height of each column and the density of solids therein sufficient to effect downward flow thereof and to provide a seal between said inner and outer contacting zones.

9. The method of claim 8 which includes the further steps of centrifugally separating solids from said first gaseous stream after it has left the dense phase in the inner contacting zone and before it is removed from said zone, returning the centrifugally separated solids to a dense catalyst phase in the inner zone, centrifugally separating solids from the second gaseous stream after it has left the dense phase in the outer contacting zone but before it is removed from said zone and returning said last-named centrifugally separated solids to a dense solids phase in said outer contacting zone.

10. A cyclic process for separately contacting solids of small particle size with at least three separate gaseous streams which method comprises suspending said solids in a first gaseous stream and passing said stream upwardly through an inner contacting zone at a velocity for producing a dense turbulent solids phase in said zone which is superimposed by a dilute solids phase, removing solids while still in dense phase condition as a downwardly moving column directly from the dense phase in said inner contacting zone through an intermediate contacting zone which is adjacent said inner contacting zone and in heat exchange relationship therewith, introducing a second gaseous stream into said column and passing said stream upwardly in said column countercurrent to the downwardly flowing dense phase solids therein, discharging solids from the base of said column directly into an outer annular contacting zone surrounding said inner zone and said intermediate zone respectively and also in heat exchange relationship with at least a part of said intermediate zone, suspending solids thus introduced from the base of said column in a third gaseous stream and passing said stream upwardly in said outer contacting zone at a velocity for maintaining a dense turbulent solids phase therein superimposed by a dilute solids phase, withdrawing solids directly from the dense turbulent solids phase in said outer contacting zone as a downwardly moving aerated column for suspension in said first gaseous stream, withdrawing said first gaseous stream combined with said second gaseous stream from the upper part of said inner zone, separately withdrawing said third gaseous stream from the upper part of said outer contacting zone and maintaining a height of each column and an aerated solids density therein sufficient to effect a downward flow thereof and to provide a seal between said inner and outer zones.

11. The process of claim 10 wherein said solids consist essentially of hydrocarbon conversion catalyst material, wherein the first gaseous stream consists essentially of hydrocarbon vapors, said second gaseous stream is a stripping gas, and said third gaseous stream is an oxygen-containing regeneration gas, wherein endothermic conversion at a high temperature is effected by said solids in said inner zone thereby causing an accumulation of carbonaceous deposits on said solids, wherein stripping is effected in said intermediate zone, and wherein exothermic regeneration is effected in said outer zone, a part of the heat liberated by said exothermic regeneration being imparted to the intermediate zone through the heat exchange relationship of the outer and intermediate zones respectively.

12. The process of contacting separate gasiform streams with suspended solids of small particle size which process comprises contacting said solids with a first gasiform stream within a first contacting zone, maintaining a dense turbulent suspended solids phase within said first contacting zone and a relatively dilute solids phase above said dense solids phase, continuously separating solids from said first gasiform stream in the dilute phase of said first contacting zone and returning said separated solids to said dense solids phase, withdrawing the first gasiform stream from the first contacting zone, downwardly withdrawing solids in dense aerated condition directly from said dense phase in the first contacting zone and introducing said downwardly withdrawn solids at a low point into a second dense turbulent suspended solids phase in a second contacting zone maintained in heat exchange with said first contacting zone, passing a second gasiform stream upwardly through said second contacting zone at a velocity to maintain said second dense turbulent suspended solids phase superimposed by a second relatively dilute solids phase, continuously separating solids from said second gasiform stream in said second dilute solids phase and returning the separated solids to said second dense phase, withdrawing said second gasiform stream from said second contacting zone, downwardly withdrawing dense phase aerated solids from an upper part of said second dense phase to a point below the bottom level of said second dense phase, introducing said first gasiform stream into said last-named withdrawn solids and conveying said last-named withdrawn solids via said stream upwardly to said first-named dense solids phase in heat exchange relationship with solids being downwardly withdrawn from said second dense solids phase.

13. The process of contacting separate gasiform streams with suspended solids of small particle size which process comprises effecting contact between said solids and a first gasiform stream at elevated temperature within a first contacting zone, maintaining a dense turbulent suspended solids phase within said zone and a relatively dilute solids phase above said dense solids phase, continuously separating solids from the first gasiform stream in the dilute phase in said contacting zone and returning said solids to said dense phase, withdrawing a substantially catalyst-free gasiform stream from the upper part of said zone, separately withdrawing solids downwardly from said dense phase in said contacting zone, maintaining said downwardly withdrawn solids in aerated dense phase condition and introducing them into a second contacting zone maintained in heat exchange relationship with said first contacting zone, passing a second gasiform stream upwardly in said second contacting zone at a rate to maintain therein a second dense turbulent suspended solids phase superimposed by a second dilute solids phase, separating solids from said second dilute phase and returning them to said second dense phase, withdrawing a substantially solids-free gasiform stream from the upper part of the second contacting zone, withdrawing solids in dense phase aerated condition from said second dense phase in said second contacting zone, returning said solids to said first dense phase in said first contacting zone and maintaining a column of solids withdrawn from the second contacting zone in heat exchange relationship with solids being returned to said first contacting zone.

14. An apparatus for contacting solids of small particle size with a plurality of separate gasiform streams which apparatus comprises a first contacting chamber, means for introducing a first gasiform stream at the base of said chamber, means for withdrawing substantially solids-free gas from the upper part of said chamber, a second contacting chamber contiguous with said first chamber by having a common wall therebetween, means including a substantially vertical transfer conduit for introducing a second gasiform stream at the base of said second chamber, means for removing substantially solids-free gases from the upper part of said second chamber, a substantially vertical standpipe with its upper end communicating with said second chamber and its lower end communicating with the first chamber, means for controlling flow of solids through said standpipe, a second standpipe concentric at its lower end with said vertical transfer conduit and extending downwardly from said first contacting chamber for discharging solids directly into the substantially vertical transfer conduit and means for controlling the flow of solids in said second standpipe.

15. The apparatus of claim 14 which includes means for introducing a third gasiform stream into at least one of said standpipes.

ROBERT C. GUNNESS.

REFERENCES CITED

The following references are of record in the file of this patent:

UNITED STATES PATENTS

| Number | Name | Date |
|---|---|---|
| 1,845,058 | Pier | Feb. 16, 1932 |
| 2,253,486 | Belchetz | Aug. 19, 1941 |
| 2,263,363 | Menshih | Nov. 18, 1941 |
| 2,273,075 | Weems | Feb. 17, 1942 |
| 2,248,196 | Plummer | July 8, 1941 |
| 2,305,569 | Degnen | Dec. 15, 1942 |
| 2,341,193 | Scheineman | Feb. 8, 1944 |
| 2,412,152 | Huff | Dec. 3, 1946 |
| 2,417,973 | Degnen | Mar. 25, 1947 |

FOREIGN PATENTS

| Number | Country | Date |
|---|---|---|
| 533,037 | Germany | Sept. 8, 1931 |